(12) United States Patent
Chen

(10) Patent No.: US 6,469,926 B1
(45) Date of Patent: Oct. 22, 2002

(54) MAGNETIC ELEMENT WITH AN IMPROVED MAGNETORESISTANCE RATIO AND FABRICATING METHOD THEREOF

(75) Inventor: Eugene Youjun Chen, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/532,721

(22) Filed: Mar. 22, 2000

(51) Int. Cl.[7] ............................................. G11C 11/00
(52) U.S. Cl. .................... 365/158; 365/171; 365/173; 360/324.11
(58) Field of Search ................. 365/158, 171, 365/173; 360/324.11, 324.2, 314, 113

(56) References Cited

U.S. PATENT DOCUMENTS

| | | | |
|---|---|---|---|
| 6,175,475 B1 * | 1/2001 | Lin et al. | 360/324.11 |
| 6,259,586 B1 * | 7/2001 | Gill | 360/324.2 |
| 6,295,225 B1 * | 9/2001 | Oepts | 365/171 |

FOREIGN PATENT DOCUMENTS

EP          09325746      6/1999

OTHER PUBLICATIONS

Wang et al., "Spin Dependent Tunnel/Spin–Valve Devices with Different Pinning Structures made by Photolithography," J.of Appl. Physics, vol. 85, No. 8 part 02A, Apr. 15, 1999, pp.5255–5257.

* cited by examiner

*Primary Examiner*—Son T. Dinh
(74) *Attorney, Agent, or Firm*—William E. Koch

(57) ABSTRACT

An improved and novel magnetic element and fabrication method. The magnetic element (10;30) including a bottom pinned ferromagnetic layer (12;32) and a top pinned ferromagnetic layer (20;40) fabricated antiparallel to one another. The magnetic element (10;30) further including a bottom tunnel barrier layer (14;34), a free ferromagnetic layer (16;46 and 48) and a top tunnel barrier layer (18;38) formed between the bottom pinned ferromagnetic layer (12;32) and the top pinned ferromagnetic layer (20;40). The structure is defined as including two (2) tunnel barrier layers in which one tunnel barrier layer is normal (18) and one is reversed (14), or a structure in which the two tunnel barrier layers are of the same type (34; 38) with the structure further includes a SAF structure (36) to allow for consistently changing magnetoresistance ratios across both tunnel barriers. The magnetic element (10;30) having an improved magnetoresistance ratio and a decrease in voltage dependence.

19 Claims, 1 Drawing Sheet

MAGNETIC ELEMENT WITH AN IMPROVED MAGNETORESISTANCE RATIO AND FABRICATING METHOD THEREOF

This application is related to a co-pending application that bears U.S. Ser. No. 09/144,686, entitled "MAGNETIC RANDOM ACCESS MEMORY AND FABRICATING METHOD THEREOF," filed on Aug. 31, 1998, assigned to the same assignee and incorporated herein by this reference, application that bears U.S. Ser. No. 08/986,764, entitled "PROCESS OF PATTERNING MAGNETIC FILMS" filed on Dec. 8, 1997, assigned to the same assignee and incorporated herein by this reference and issued U.S. Pat. No. 5,768,181, entitled "MAGNETIC DEVICE HAVING MULTI-LAYER WITH INSULATING AND CONDUCTIVE LAYERS", issued Jun. 16, 1998, assigned to the same assignee and incorporated herein by.

FIELD OF THE INVENTION

The present invention relates to magnetic elements for information storage and/or sensing and a fabricating method thereof, and more particularly, to a method of fabricating and thus defining the magnetic element to improve the magnetoresistance ratio.

BACKGROUND OF THE INVENTION

Typically, a magnetic element, such as a magnetic memory element, has a structure that includes ferromagnetic layers separated by a non-magnetic layer. Information is stored as directions of magnetization vectors in magnetic layers. Magnetic vectors in one magnetic layer, for instance, are magnetically fixed or pinned, while the magnetization direction of the other magnetic layer is free to switch between the same and opposite directions that are called "parallel" and "anti-parallel" states, respectively. In response to parallel and anti-parallel states, the magnetic memory element represents two different resistances. The resistance has minimum and maximum values when the magnetization vectors of the two magnetic layers point in substantially the same and opposite directions, respectively. Accordingly, a detection of change in resistance allows a device, such as an MRAM device, to provide information stored in the magnetic memory element. The difference between the minimum and maximum resistance values, divided by the minimum resistance is known as the magnetoresistance ratio (MR).

An MRAM device integrates magnetic elements, more particularly magnetic memory elements, and other circuits, for example, a control circuit for magnetic memory elements, comparators for detecting states in a magnetic memory element, input/output circuits, etc. These circuits are fabricated in the process of CMOS (complementary metal-oxide semiconductor) technology in order to lower the power consumption of the device.

Magnetic elements structurally include very thin layers, some of which are tens of angstroms thick. The manufacturability throughput and performance of the magnetic element is conditioned upon the magnetic structure utilized and its complexity. Accordingly, it is necessary to make a magnetic device in which a simple structure is sought. A magnetic element structure in which including are fewer layers than the standard magnetic element and less targets, is sought. In addition, it is sought to build a device in which a centered R-H(I) loop does not depend on the precise overly for each of the millions to billions of bits.

During typical magnetic element fabrication, such as MRAM element fabrication, metal films are grown by sputter deposition, evaporation, or epitaxy techniques. One such magnetic element structure includes a substrate, a base electrode multilayer stack, a synthetic antiferromagnetic (SAF) structure, an insulating tunnel barrier layer, and a top electrode stack. The base electrode layer stack is formed on the substrate and includes a first seed layer deposited on the substrate, a template ferromagnetic layer formed on the seed layer, a layer of an antiferromagnetic material on the template layer and a pinned ferromagnetic layer formed on and exchange coupled with the underlying antiferromagnetic layer. The ferromagnetic layer is called the pinned layer because its magnetic moment (magnetization direction) is prevented from rotation in the presence of an applied magnetic field. The SAF structure includes a pinned ferromagnetic layer, and a fixed ferromagnetic layer, separated by a layer of ruthenium, or the like. The top electrode stack includes a free ferromagnetic layer and a protective layer formed on the free layer. The magnetic moment of the free ferromagnetic layer is not pinned by exchange coupling, and is thus free to rotate in the presence of applied magnetic fields. As described, this type of magnetic element structure includes a very complex arrangement of layers and as such is not amenable to high throughput.

An alternative structure includes, a magnetic element material stack which includes three magnetic layers separated by one tunnel barrier and one conductive spacer, such as $TaN_y$. The middle magnetic layer is formed so that it is free to rotate or change direction, while the top and bottom magnetic layers are locked in an antiparallel arrangement or direction due to lowered energy from flux closure at the ends. During operation, the structure will have different resistances depending on which of the two directions the middle magnetic layer points its magnetization. In order to achieve a magnetic element which includes a better signal, or an improved magnetoresistance ratio, it is desirable to includes dual tunnel barrier layers. Yet, it has been found that this structure will fail if a tunnel barrier is utilized in the place of the conductive spacer.

Accordingly, it is a purpose of the present invention to provide an improved magnetic element with an improved magnetoresistance ratio.

It is another purpose of the present invention to provide an improved magnetic element that includes a higher MR% or signal, and less voltage dependence.

It is a still further purpose of the present invention to provide a method of forming a magnetic element with an improved magnetoresistance ratio.

It is still a further purpose of the present invention to provide a method of forming a magnetic element with an improved magnetoresistance ratio which is amenable to high throughput manufacturing.

SUMMARY OF THE INVENTION

These needs and others are substantially met through provision of a magnetic element including a first magnetic layer, comprised of a pinned ferromagnetic material, a second magnetic layer, that is free to rotate, a third magnetic layer, comprised of a pinned ferromagnetic material, and two (2) tunnel barrier layers. The structure is defined as including two (2) tunnel barrier layers in which one tunnel barrier layer is normal and one is reversed, or a structure in which the two tunnel barrier layers are of the same type and the structure further includes a SAF structure to allow for same sign changing magnetoresistance ratios across both tunnel barriers. A spacer layer is generally included when the magnetic element includes the SAF structure. The magnetic element further includes a metal lead. The metal lead, the plurality of magnetic layers, the plurality of tunnel barrier layers, and the spacer layer being formed on a substrate material, such as a dielectric. Additionally disclosed is a method of fabricating the magnetic element with an improved magnetoresistance ratio.

DETAILED DESCRIPTION OF THE PREFERRED EMBODIMENTS

Figure 1:
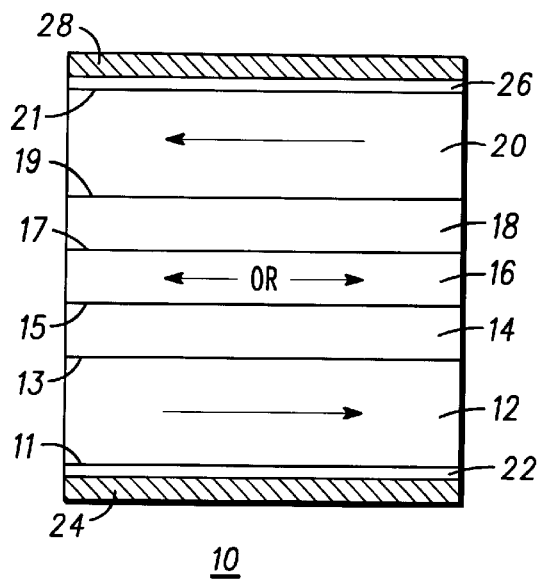
FIGS. 1 and 2 illustrate in cross-sectional views, first and second embodiments of a magnetic element with an improved magnetoresistance ratio according to the present invention.
Figure 2:
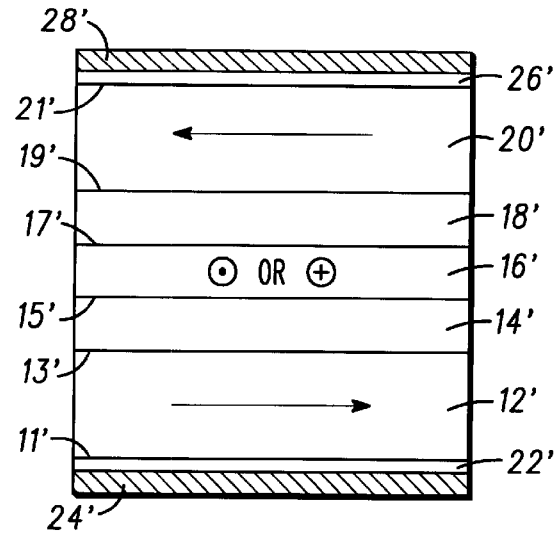

During the course of this description, like numbers are used to identify like elements according to the different figures that illustrate the invention. FIGS. 1 and 2 illustrate in cross-sectional views a first and second embodiment of a magnetic element according to the present invention. More particularly, illustrated in FIG. 1, is a first embodiment of a fully patterned magnetic element 10. Magnetic element 10 structurally includes a bottom pinned magnetic layer 12, a bottom tunnel barrier layer 14, a free magnetic layer 16, a top tunnel barrier layer 18, and a top pinned magnetic layer 20. Bottom pinned magnetic layer 12, free magnetic layer 16 and top pinned magnetic layer 20 include ferromagnetic layers. Bottom magnetic layer 12 is formed on a diffusion barrier layer 22 which is formed on a metal lead 24. Diffusion barrier layer 22 is typically formed of tantalum nitride (TaN), and aids in the thermal stability of magnetic element 10. Metal lead 24 is typically formed on some type of dielectric material (not shown).

Bottom and top pinned ferromagnetic layers 12 and 20 are described as pinned, or fixed, in that their magnetic moment is prevented from rotation in the presence of an applied magnetic field. Ferromagnetic layers 12, 16 and 20 are typically formed of alloys of one or more of the following: nickel (Ni), iron (Fe), and cobalt (Co) and each include a top surface 13, 17, and 21, respectively, and a bottom surface 11, 15 and 19, respectively. Magnetic layer 16 is described as a free ferromagnetic layer. Accordingly, the magnetic moment of free ferromagnetic layer 16 is not fixed, or pinned, by exchange coupling or magnetostatic coupling through flux closure, and is free to rotate in the presence of an applied magnetic field. Free ferromagnetic layer 16 is formed co-linear with pinned magnetic layers 12 and 20 and of alloys of one or more of the following: nickel (Ni), iron (Fe), and cobalt (Co). Pinned ferromagnetic layers 12 and 20 are described as having a thickness within a range of 5–5000 Å. Free ferromagnetic layer 16 is described as having a thickness generally less than 500 Å. A second diffusion barrier layer 26 is formed on an uppermost surface 21 of top pinned magnetic layer 20. A metal lead 28 is formed on a surface of second diffusion barrier layer 26.

In this particular embodiment, bottom tunnel barrier layer 14 is formed of tantalum (Ta) and oxygen (0). More particularly, bottom tunnel barrier layer 14 is formed having a general formula of $TaO_Y$, where $1<Y<2.5$. Top tunnel barrier layer 18 is formed of oxidized aluminum (Al), generally having the formula $AlO_x$, where $x \leq 1.5$.

In this particular embodiment, top tunnel barrier layer 18 is described as being a normal tunnel barrier, such that the magnetic tunnel junction has a maximum resistance (R) for anti-parallel aligned magnetic electrodes, and a minimum resistance (R) for parallel aligned magnetic electrodes. More specifically, when free ferromagnetic layer 16 is aligned parallel with bottom pinned magnetic layer 12 and anti-parallel to top pinned magnetic layer 20, maximum resistance is achieved. When free ferromagnetic layer 16 is aligned anti-parallel with bottom pinned magnetic layer 12 and aligned parallel with top pinned ferromagnetic layer 20, minimum resistance is achieved. Bottom tunnel barrier 14 is described as being a reverse tunnel barrier such that the magnetic tunnel junction has a maximum resistance (R) for parallel aligned magnetic electrodes, and a minimum resistance (R) for anti-parallel aligned magnetic electrodes. This type of structure provides for a higher magnetoresistance ratio (MR%) or stronger signal, and less voltage dependence. Typically the MR% decreases as the bias voltage increases. Accordingly, by including dual tunnel barrier layers, 16 and 18, each will see one-half of the bias voltage, thus reducing the rate of drop in MR% as the bias voltage increases. In addition, only four (4) targets are needed, and no exact overlay is required. During operation, any topological positive coupling of the free magnetic layer 16 from bottom and top are canceled. This type of structure is designed for MRAM applications. During operation of magnetic element 10, magnetic layers 12 and 20 will point and lock into an anti-parallel orientation due to magnetic flux closure and reduced magnetic energy, especially for smaller dimension memory cells for high density MRAM. Magnetic layer 16 remains free to switch directions, for use in memory devices, such as MRAM applications. Alternatively, in a larger dimension MRAM cell, pinning from an antiferromagnetic layer can be used to pin the bottom 12 and top 20 magnetic layers.

Illustrated in FIG. 2, is an alternative embodiment of a fully patterned magnetic element structure, referenced 10', typical for use in read head and magnetic sensor applications. It should be noted that all components of the first embodiment that are similar to components of the second embodiment, are designated with similar numbers, having a prime added to indicate the different embodiment. Similar to the structure described with regard to FIG. 1, this structure includes a bottom pinned magnetic layer 12', a bottom tunnel barrier layer 14', a free magnetic layer 16', a top tunnel barrier layer 18', and a top pinned magnetic layer 20'. Bottom pinned magnetic layer 12', free magnetic layer 16' and top pinned magnetic layer 20' include ferromagnetic layers. Bottom magnetic layer 12' is formed on a diffusion barrier layer 22' which is formed on a metal lead 24'. Diffusion barrier layer 22' is typically formed of tantalum nitride (TaN), and aids in the thermal stability of magnetic element 10'. Metal lead 24' is typically formed on some type of dielectric material (not shown).

Bottom and top pinned ferromagnetic layers 12' and 20' are described as pinned, or fixed, in that their magnetic moment is prevented from rotation in the presence of an applied magnetic field. Ferromagnetic layers 12', 16' and 20' are typically formed of alloys of one or more of the following: nickel (Ni), iron (Fe), and cobalt (Co) and each include a top surface 13', 17', and 21', respectively, and a bottom surface 11', 15' and 19', respectively. Magnetic layer 16' is a free ferromagnetic layer. Accordingly, the magnetic moment of free ferromagnetic layer 16' is not fixed, or pinned, by exchange coupling or magnetostatic coupling through flux closure, and is free to rotate in the presence of an applied magnetic field. Free ferromagnetic layer 16' typically formed of alloys of one or more of the following:

nickel (Ni), iron (Fe), and cobalt (Co). In contrast to the embodiment described in FIG. 1, in this particular embodiment, free ferromagnetic layer 16' is perpendicularly aligned with respect to pinned ferromagnetic layers 12' and 20'. Pinned ferromagnetic layers 12' and 20' are described as having a thickness within a range of 5–5000 Å. Free ferromagnetic layer 16' is described as having a thickness generally less than 500 Å. A second diffusion barrier layer 26' is formed on an uppermost surface 21' of top pinned magnetic layer 20'. A metal lead 28' is formed on a surface of second diffusion barrier layer 26'.

In this particular embodiment, bottom tunnel barrier layer 14' is formed of tantalum (Ta) and oxygen (O). More particularly, bottom tunnel barrier layer 14' is formed having a general formula of $TaO_y$, where $1<Y<2.5$. Top tunnel barrier layer 18' is formed of aluminum, generally having the formula $AlO_x$, where $x \leq 1.5$.

Similar to the first described embodiment, top tunnel barrier layer 18' is described as being a normal tunnel barrier, such that the magnetic tunnel junction has a maximum resistance (R) for anti-parallel aligned magnetic electrodes, and a minimum resistance (R) for parallel aligned magnetic electrodes. Tunnel barrier layer 14' is described as being a reverse tunnel barrier, as previously described with respect to FIG. 1. In contrast to the embodiment of FIG. 1, free ferromagnetic layer 16' is perpendicularly aligned with bottom pinned magnetic layer 12' and top pinned magnetic layer 20'. This type of structure provides for a higher magnetoresistance ratio (MR%) or stronger signal, and less voltage dependence. Typically the MR% decreases as the bias voltage increases. Similar to the embodiment of FIG. 1, by including dual tunnel barrier layers, 16' and 18', each will see one-half of the bias voltage, thus reducing the rate of drop in MR% as the bias voltage increases. In addition, only four (4) targets are needed, and no exact overlay is required. During operation, any topological positive coupling from bottom and top are canceled. This type of structure is designed for read head and magnetic sensor applications. During operation of magnetic element 10', magnetic layers 12' and 20' will point and lock into an anti-parallel orientation due to magnetic flux closure and reduced magnetic energy for smaller dimension devices. Magnetic layer 16' remains free to rotate perpendicularly to magnetic layers 12' and 20', and thus is suitable for use in read head or magnetic field sensors devices. Alternatively, in a larger dimension MRAM cell, pinning from an antiferromagnetic layer can be used to pin the bottom 12' and top 20' magnetic layers.

Figure 3:
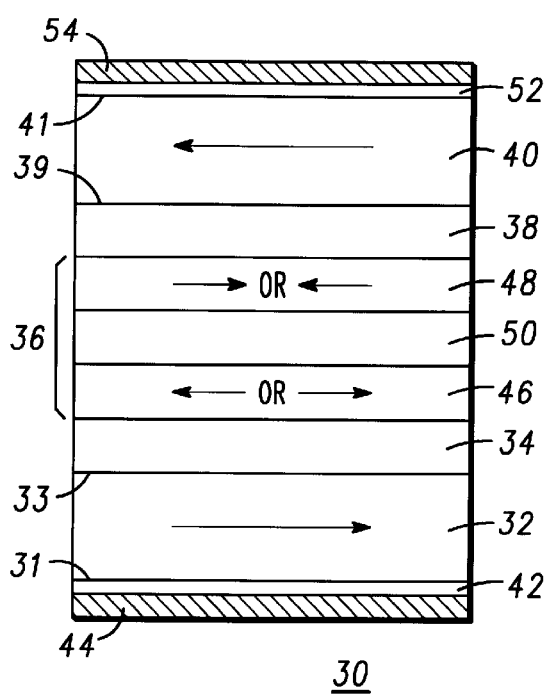
FIGS. 3 and 4 illustrate in cross-sectional views, second and third embodiments of a magnetic element with an improved magnetoresistance ratio according to the present invention.

Referring now to FIG. 3, illustrated in simplified sectional view is a third embodiment of a magnetic element, according to the present invention. More particularly, illustrated is a magnetic element 30 including as a part thereof a synthetic antiferromagnetic (SAF) structure (discussed presently). Magnetic element 30 includes a bottom pinned magnetic layer 32, a bottom tunnel barrier layer 34, a SAF structure 36, a top tunnel barrier layer 38, and a top pinned magnetic layer 40. Bottom pinned magnetic layer 32, SAF structure 36 and top pinned magnetic layer 40 include ferromagnetic layers. Bottom magnetic layer 32 is formed on a diffusion barrier layer 42 which is formed on a metal lead 44. Diffusion barrier layer 42 is typically formed of tantalum nitride (TaN), and aids in the thermal stability of magnetic element 30. Metal lead 44 is typically formed on some type of dielectric material (not shown).

Bottom and top pinned ferromagnetic layers 32 and 40 are described as pinned, or fixed, in that their magnetic moment is prevented from rotation in the presence of an applied magnetic field. Ferromagnetic layers 32 and 40 are typically formed of alloys of one or more of the following: nickel (Ni), iron (Fe), and cobalt (Co) and each include a top surface 33 and 41, respectively, and a bottom surface 31 and 39, respectively.

SAF structure 36 includes a bottom free magnetic layer 46, and a top free magnetic layer 48 formed antiparallel to each other, and co-linearly aligned relative to bottom pinned ferromagnetic layer 32 and top pinned ferromagnetic layer 40 at rest state for this embodiment. Bottom free magnetic layer 46 and top free magnetic layer 48 are separated by an exchange spacer layer 50, typically formed of a layer of ruthenium (Ru), or the like. Antiparallel alignment between free magnetic layers 46 and 48 is achieved through an exchange spacer layer 50 which induces antiferromagnetic coupling between bottom free magnetic layer 46 and top free magnetic layer 48, or through end magnetostatic coupling, or other means.

Free ferromagnetic layers 46 and 48 and pinned ferromagnetic layer 32 and 40 are typically formed of alloys of one or more of the following: nickel (Ni), iron (Fe), and cobalt (Co). Pinned ferromagnetic layers 32 and 40 are described as having a thickness within a range of 5–5000 Å. Free ferromagnetic layers 46 and 48 are described as each having a thickness generally less than 500 Å. A second diffusion barrier layer 52 is formed on an uppermost surface 41 of top pinned magnetic layer 40. A metal lead 54 is formed on a surface of second diffusion barrier layer 52.

In this particular embodiment, bottom tunnel barrier layer 34 and top tunnel barrier layer 38 are both formed of oxidized aluminum, generally having the formula $AlO_x$, where $x \leq 1.5$. It is disclosed that in this embodiment, which includes SAF structure 36, bottom tunnel barrier layer 34 and top tunnel barrier layer 38 are of the same type. More particularly, bottom tunnel barrier layer 34 and top tunnel barrier layer 38 are described as being normal tunnel barrier layers, such that the magnetic tunnel junction has a maximum resistance (R) for anti-parallel aligned magnetic electrodes, and a minimum resistance (R) for parallel aligned magnetic electrodes. More specifically, with free ferromagnetic layers 46 and 48 oppositely opposed, when bottom free magnetic layer 46 is anti-parallel to pinned magnetic layer 32 and top free magnetic layer 48 is anti-parallel to pinned magnetic layer 40, maximum resistance is achieved. When bottom free magnetic layer 46 is parallel to pinned magnetic layer 32 and top free magnetic layer 48 is parallel to pinned magnetic layer 40, minimum resistance is achieved. This magnetic element including a SAF structure provides for the inclusion of the same type of material for the formation of tunnel barrier layers 34 and 38, and for a higher magnetoresistance ratio (MR%) or stronger signal, and less voltage dependence. Typically the MR% decreases as the bias voltage increases. Accordingly, by including dual tunnel barrier layers, 34 and 38, each will see one-half of the bias voltage, thus reducing the rate of drop in MR% as the bias voltage increases. During operation, any topological positive coupling from bottom and top are canceled. This type of structure is designed for MRAM applications. During operation of magnetic element 30, magnetic layers 32 and 40 will point and lock into an anti-parallel orientation due to magnetic flux closure and reduced magnetic energy for smaller dimension devices. Magnetic layers 46 and 48 will remain free to rotate so that to stay in one of the two co-linear states to magnetic layers 32 and 40, thus making this structure suitable for use in memory devices, such as MRAM applications. Alternatively, in a larger dimension MRAM cell, pinning from an antiferromagnetic layer can be used to pin the bottom 12' and top 20' magnetic layers.

It should be understood that it is anticipated by this disclosure to include SAF structure 36 that is formed between two tunnel barrier layers 34 and 38 as previously disclosed, or alternatively below bottom tunnel barrier layer 34, or on a surface 39 of top tunnel barrier layer 38. The inclusion of SAF structure 36 between bottom tunnel barrier layer 34 and top tunnel barrier layer 38 is described with respect to FIG. 3, for ease of disclosure.

Figure 4:
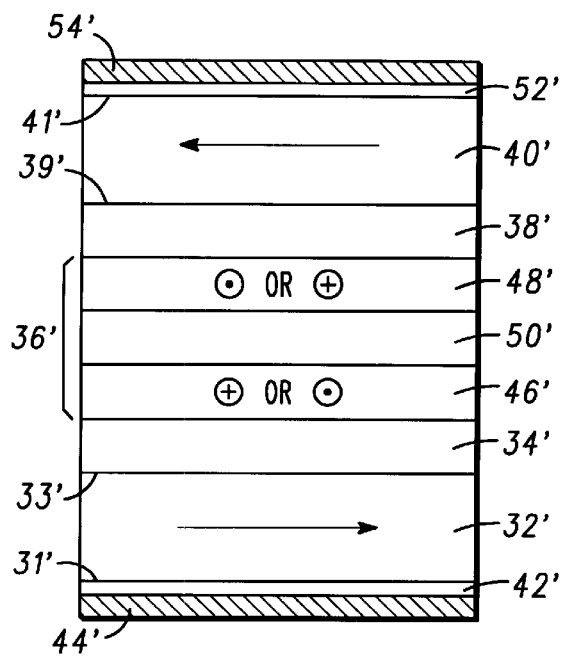

Referring now to FIG. 4, illustrated in simplified sectional view is a fourth embodiment of a magnetic element, according to the present invention. It should be noted that all components of the third embodiment as illustrated in FIG. 3, that are similar to components of the fourth embodiment, are designated with similar numbers, having a prime added to indicate the different embodiment. Similar to the structure described with regard to FIG. 3, this structure includes a magnetic element 30' including as a part thereof a synthetic antiferromagnetic (SAF) structure. Magnetic element 30' includes a bottom pinned magnetic layer 32', a bottom tunnel barrier layer 34', a SAF structure 36', a top tunnel barrier layer 38', and a top pinned magnetic layer 40'. Bottom pinned magnetic layer 32', SAF structure 36' and top pinned magnetic layer 40' include ferromagnetic layers. Bottom magnetic layer 32' is formed on a diffusion barrier layer 42' which is formed on a metal lead 44'. Diffusion barrier layer 42' is typically formed of tantalum nitride (TaN), and aids in the thermal stability of magnetic element 30. Metal lead 44' is typically formed on some type of dielectric material (not shown).

Bottom and top pinned ferromagnetic layers 32' and 40' are described as pinned, or fixed, in that their magnetic moment is prevented from rotation in the presence of an applied magnetic field. Ferromagnetic layers 32' and 40' are typically formed of alloys of one or more of the following: nickel (Ni), iron (Fe), and cobalt (Co) and each include a top surface 33' and 41', respectively, and a bottom surface 31' and 39', respectively.

SAF structure 36' includes a bottom free magnetic layer 46', and a top free magnetic layer 48' formed antiparallel to each other and perpendicularly aligned relative to bottom pinned ferromagnetic layer 32' and top pinned ferromagnetic layer 40'. Bottom free magnetic layer 46' and top free magnetic layer 48' are separated by an exchange spacer layer 50', typically formed of a layer of ruthenium (Ru) or the like. Antiparallel alignment between free magnetic layers 46' and 48' is achieved through an exchange spacer layer 50' which induces antiferromagnetic coupling between bottom free magnetic layer 46' and top free magnetic layer 48', or through end magnetostatic coupling, or other means.

Free ferromagnetic layers 46' and 48' and pinned ferromagnetic layer 32' and 40' are typically formed of alloys of one or more of the following: nickel (Ni), iron (Fe), and cobalt (Co). Pinned ferromagnetic layers 32' and 40' are described as having a thickness within a range of 5–5000 Å. Free ferromagnetic layers 46' and 48' are described as each having a thickness generally less than 500 Å. A second diffusion barrier layer 52' is formed on an uppermost surface 41' of top pinned magnetic layer 40'. A metal lead 54' is formed on a surface of second diffusion barrier layer 52'.

In this particular embodiment, bottom tunnel barrier layer 34' and top tunnel barrier layer 38' are formed of an oxidized aluminum, generally having the formula $AlO_x$, where $x \leq 1.5$. It is disclosed that in this embodiment, which includes SAF structure 36', bottom tunnel barrier layer 34' and top tunnel barrier layer 38' are of the same type. More particularly, bottom tunnel barrier layer 34' and top tunnel barrier layer 38' are described as being normal tunnel barrier layers, such that the magnetic tunnel junction has a maximum resistance (R) for anti-parallel aligned magnetic electrodes, and a minimum resistance (R) for parallel aligned magnetic electrodes. More specifically, with free ferromagnetic layers 46' and 48' oppositely opposed, when bottom free magnetic layer 46' is rotated to be anti-parallel to pinned magnetic layer 32' and top free magnetic layer 48' is rotated to be anti-parallel to pinned magnetic layer 40', maximum resistance is achieved. When bottom free magnetic layer 46' is rotated to be parallel to pinned magnetic layer 32' and top free magnetic layer 48' is rotated to be parallel to pinned magnetic layer 40', minimum resistance is achieved. This type of structure provides the inclusion of the same type of material for the formation of tunnel barrier layers 34' and 38', and for a higher magnetoresistance ratio (MR%) or stronger signal, and less voltage dependence. Typically the MR% decreases as the bias voltage increases. Accordingly, by including dual tunnel barrier layers, 34' and 38', each will see one-half of the bias voltage, thus reducing the rate of drop in MR% as the bias voltage increases. During operation, any topological positive coupling from bottom and top are canceled. This type of structure is designed for read head and magnetic sensor applications. During operation of magnetic element 30', magnetic layers 32' and 40' will point and lock into an anti-parallel orientation due to magnetic flux closure and reduced magnetic energy. Magnetic layers 46' and 48' will remain free to rotate around the perpendicular direction to magnetic layers 32' and 40' when they detect a magnetic field, thus producing linear voltage change in proportion to the magnetic field it detects, and making this structure suitable for use in magnetic read head devices and magnetic sensors.

It should be understood that it is anticipated by this disclosure to include SAF structure 36' that is formed between two tunnel barrier layers 34' and 38' as previously disclosed, or alternatively below bottom tunnel barrier layer 34', or on a surface 39' of top tunnel barrier layer 38'. The inclusion of SAF structure 36' between bottom tunnel barrier layer 34' and top tunnel barrier layer 38' is described with respect to FIG. 4, for ease of disclosure.

Thus, a magnetic element with an improved magnetoresistance ratio and fabricating method thereof is disclosed in which the magnetoresistance ratio is improved based on the inclusion of dual tunnel barrier layers. As disclosed, this technique can be applied to devices using patterned magnetic elements, such as magnetic sensors, magnetic recording heads, magnetic recording media, or the like. Accordingly, such instances are intended to be covered by this disclosure.

What is claimed is:

1. A magnetic element comprising:
    a bottom pinned ferromagnetic layer having a top surface and a bottom surface whose magnetization is fixed in a preferred direction in the presence of an applied magnetic field:
    a top pinned ferromagnetic layer having a top surface and a bottom surface whose magnetization is pinned in a preferred direction in the presence of an applied magnetic field, the bottom pinned ferromagnetic layer and the top pinned ferromagnetic layer fabricated antiparallel to one another; and
    a bottom tunnel barrier layer, a free ferromagnetic layer and a top tunnel barrier layer formed between the bottom pinned ferromagnetic layer and the top pinned ferromagnetic layer, wherein the top tunnel barrier layer is normal thereby forming a magnetic tunnel junction having a maximum resistance for anti-parallel aligned magnetic electrodes and a minimum resistance for parallel aligned magnetic electrodes and the bottom tunnel barrier layer is reverse thereby having a magnetic tunnel junction having a maximum resistance for parallel aligned magnetic electrodes and a minimum resistance for anti-parallel magnetic electrodes.

2. A magnetic element as claimed in claim 1 wherein the free ferromagnetic layers and the top pinned ferromagnetic layer and the bottom pinned ferromagnetic layer include at least one of NiFe, NiFeCo, CoFe, or Co.

3. A magnetic element as claimed in claim 2 wherein the free ferromagnetic layer is formed as a single layer separating the bottom tunnel barrier and the top tunnel barrier layer, the free ferromagnetic layer having its magnetization free to rotate in the presence of an applied magnetic field.

4. A magnetic element as claimed in claim 3 wherein the top tunnel barrier layer is formed of $AlO_x$ and the bottom tunnel barrier layer is formed of $TaO_Y$.

5. A magnetic element as claimed in claim 4 wherein the free ferromagnetic layer is aligned co-linearly with the bottom pinned ferromagnetic layer and the top pinned ferromagnetic layer.

6. A magnetic element as claimed in claim 4 wherein the free ferromagnetic layer is aligned perpendicularly with the bottom pinned ferromagnetic layer and the top pinned ferromagnetic layer.

7. A magnetic element as claimed in claim 2 wherein the free ferromagnetic layer is formed as a synthetic antiferromagnetic (SAF) structure formed one of separating the bottom tunnel barrier layer and the top tunnel barrier layer, adjacent a top surface of the bottom tunnel barrier layer or adjacent a bottom surface of the top tunnel barrier layer.

8. A magnetic element as claimed in claim 7 wherein the synthetic antiferromagnetic structure includes a first free ferromagnetic layer and a second free ferromagnetic layer, separated by a spacer layer including antiferromagnetic exchange coupling, thereby defining the SAF structure.

9. A magnetic element as claimed in claim 8 wherein the bottom tunnel barrier layer and the top tunnel barrier layer are formed of one of $TaO_y$ or $AlO_x$.

10. A magnetic element as claimed in claim 9 wherein the first free ferromagnetic layer and the second free ferromagnetic layer are aligned co-linearly to the first pinned ferromagnetic layer and the second pinned ferromagnetic layer.

11. A magnetic element as claimed in claim 9 wherein the first free ferromagnetic layer and the second free ferromagnetic layer are aligned perpendicularly to tho top pinned ferromagnetic layer and the bottom pinned ferromagnetic layer.

12. A magnetic element comprising:
a bottom pinned ferromagnetic layer having a top surface and a bottom surface whose magnetization is fixed in a preferred direction in the presence of an applied magnetic field;
a bottom tunnel barrier layer formed on the top surface of the bottom pinned ferromagnetic layer;
a free ferromagnetic layer formed on a top surface of the bottom tunnel barrier layer, the free ferromagnetic layer having a top surface and a bottom surface whose magnetization is free to rotate in the presence of an applied magnetic field;
a top tunnel barrier layer formed on the top surface of the free ferromagnetic layer; and
a top pinned ferromagnetic layer formed on the top surface of the top tunnel barrier layer, the top pinned ferromagnetic layer having a magnetization that is fixed in a preferred direction in the presence of an applied magnetic field,
whereby the free ferromagnetic layer is aligned one of co-linearly with the bottom pinned ferromagnetic layer and the top pinned ferromagnetic layer or aligned perpendicularly with the bottom pinned ferromagnetic layer and the top pinned ferromagnetic layer.

13. A magnetic element as claimed in claim 12 wherein the free ferromagnetic layer, the top pinned ferromagnetic layer, and the bottom pinned ferromagnetic layer include at least one of NiFe, NiFeCo, CoFe, or Co.

14. A magnetic element as claimed in claim 13 wherein the top tunnel barrier layer is formed of $AlO_x$ and the bottom tunnel barrier layer is formed of $TaO_Y$.

15. A magnetic element comprising:
a bottom pinned ferromagnetic layer having a top surface and a bottom surface whose magnetization is fixed in a preferred direction in the presence of an applied magnetic field;
a top pinned ferromagnetic layer having a top surface and a bottom surface whose magnetization is pinned in a preferred direction in the presence of an applied magnetic field, the bottom pinned ferromagnetic layer and the top pinned ferromagnetic layer fabricated antiparallel to one another: and
a bottom tunnel barrier layer, a synthetic antiferromagnetic (SAF) structure including a free ferromagnetic layer and a top tunnel barrier layer formed between the bottom pinned ferromagnetic layer and the top pinned ferromagnetic layer, where the top tunnel barrier layer is normal thereby forming a magnetic tunnel junction having a maximum resistance for anti-parallel aligned magnetic electrodes and a minimum resistance for parallel aligned magnetic electrodes and the bottom tunnel barrier layer is reverse thereby having a magnetic tunnel junction having a maximum resistance for parallel aligned magnetic electrodes and a minimum resistance for anti-parallel magnetic electrodes.

16. A magnetic element as claimed in claim 15 wherein the SAF structure is formed one of separating the bottom tunnel barrier layer and the top tunnel barrier layer, adjacent a bottom surface of the top tunnel barrier layer or adjacent a top surface of the bottom tunnel barrier layer.

17. A magnetic element as claimed in claim 16 wherein the SAF structure includes a first free ferromagnetic layer and a second free ferromagnetic layer, separated by a spacer layer including antiferromagnetic exchange coupling, thereby defining the SAF structure.

18. A magnetic element as claimed in claim 17 wherein the bottom tunnel barrier layer is formed of one of $TaO_y$ or $AlO_x$.

19. A magnetic element as claimed in claim 18 wherein the top free ferromagnetic layer and the bottom free ferromagnetic layer are aligned one of co-linearly to the top pinned ferromagnetic layer and the bottom pinned ferromagnetic layer or perpendicularly to the top pinned ferromagnetic layer and the bottom pinned ferromagnetic layer.

* * * * *

UNITED STATES PATENT AND TRADEMARK OFFICE
CERTIFICATE OF CORRECTION

PATENT NO. : 6,469,926 B1
DATED : October 22, 2002
INVENTOR(S) : Chen

It is certified that error appears in the above-identified patent and that said Letters Patent is hereby corrected as shown below:

<u>Title page,</u>
After the Title, please add as a new first paragraph the following paragraph:

-- This invention was made with Government support under Agreement No. MDA972-96-3-0016 awarded by DARPA. The Government has certain rights in the invention. --

Signed and Sealed this

Seventh Day of October, 2003

JAMES E. ROGAN
*Director of the United States Patent and Trademark Office*